US011756089B2

(12) United States Patent
Jung et al.

(10) Patent No.: US 11,756,089 B2
(45) Date of Patent: Sep. 12, 2023

(54) SERVICE INTEGRATION WITH USER INTERFACE

(71) Applicant: NCR Corporation, Atlanta, GA (US)

(72) Inventors: Nack Kyoo Jung, Atlanta, GA (US); Michael Robert Dunn, Tucker, GA (US); Shuyi Wang, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 105 days.

(21) Appl. No.: 17/036,695

(22) Filed: Sep. 29, 2020

(65) Prior Publication Data

US 2022/0101397 A1 Mar. 31, 2022

(51) Int. Cl.
*G06Q 30/00* (2023.01)
*G06Q 30/0601* (2023.01)
*G06Q 30/0226* (2023.01)
*G06F 16/9538* (2019.01)
*G06Q 20/32* (2012.01)
*G06F 9/54* (2006.01)
*G06F 16/2457* (2019.01)
*G06F 16/9535* (2019.01)
*G06Q 20/12* (2012.01)

(52) U.S. Cl.
CPC ......... *G06Q 30/0605* (2013.01); *G06F 9/543* (2013.01); *G06F 9/547* (2013.01); *G06F 16/24578* (2019.01); *G06F 16/9535* (2019.01); *G06F 16/9538* (2019.01); *G06Q 20/12* (2013.01); *G06Q 20/326* (2020.05); *G06Q 30/0226* (2013.01); *G06Q 30/0627* (2013.01); *G06Q 30/0635* (2013.01); *G06Q 30/0639* (2013.01); *G06Q 30/0643* (2013.01)

(58) Field of Classification Search
None
See application file for complete search history.

(56) References Cited

U.S. PATENT DOCUMENTS

| 6,914,582 | B2 * | 7/2005 | Tanaka | G06Q 30/06 |
| | | | | 345/157 |
| 9,031,867 | B1 * | 5/2015 | Crawford | G06Q 30/0601 |
| | | | | 705/26.1 |

(Continued)

FOREIGN PATENT DOCUMENTS

| EP | 1199660 A1 * | 4/2002 | G06Q 30/02 |
| JP | 2020087231 A * | 6/2020 | G06Q 50/12 |
| WO | WO-2004097550 A2 * | 11/2004 | G06Q 30/08 |

OTHER PUBLICATIONS

• Alison DeNisco Rayome. "Best food delivery service: DoorDash, Grubhub, Uber Eats and more compared." (May 13, 2020). Retrieved online Mar. 9, 2022. https://www.cnet.com/tech/services-and-software/best-food-delivery-service/ (Year: 2020).*

(Continued)

*Primary Examiner* — James A Reagan
(74) *Attorney, Agent, or Firm* — Schwegman Lundberg & Woessner, P.A.

(57) ABSTRACT

Ordering systems for a plurality of retailer service providers are integrated and provided through a single mobile application (app) to users for user-defined orders. Moreover, payment processing of the retailer service providers are integrated and available for processing payments of the orders through the single mobile app. Retailer-specific branding is maintained and provided through the app.

17 Claims, 12 Drawing Sheets

(56) References Cited

U.S. PATENT DOCUMENTS

| | | | | |
|---|---|---|---|---|
| 9,384,505 | B1* | 7/2016 | Cao | G06Q 30/0633 |
| 10,217,144 | B1* | 2/2019 | Hession | H04W 4/023 |
| 10,366,434 | B1* | 7/2019 | Belousova | G06Q 30/0627 |
| 10,445,683 | B1* | 10/2019 | Hession | G06F 16/2228 |
| 10,482,442 | B2* | 11/2019 | Priebatsch | G06Q 20/3224 |
| 10,489,765 | B2* | 11/2019 | Priebatsch | G06Q 30/0619 |
| 10,497,040 | B2* | 12/2019 | Cao | G06Q 30/0625 |
| 10,592,883 | B2* | 3/2020 | Priebatsch | G06Q 20/202 |
| 10,650,437 | B2* | 5/2020 | Tsao | G06Q 30/0643 |
| 11,132,728 | B2* | 9/2021 | Holme | G06Q 30/0633 |
| 11,132,730 | B2* | 9/2021 | Cao | G06Q 20/14 |
| 2003/0061147 | A1* | 3/2003 | Fluhr | G06Q 40/04 705/37 |
| 2006/0218043 | A1* | 9/2006 | Rosenzweig | G06Q 50/12 705/15 |
| 2007/0067297 | A1* | 3/2007 | Kublickis | G06Q 30/02 707/999.009 |
| 2009/0167553 | A1* | 7/2009 | Hong | G06Q 10/06 340/4.61 |
| 2011/0208822 | A1* | 8/2011 | Rathod | G06Q 30/02 709/206 |
| 2012/0036028 | A1* | 2/2012 | Webb | G06Q 50/12 705/15 |
| 2012/0232917 | A1* | 9/2012 | Al-Khudairy | G06Q 10/02 705/26.1 |
| 2012/0278204 | A1* | 11/2012 | Urano | G06Q 10/08 705/28 |
| 2013/0238451 | A1* | 9/2013 | Riscalla | G06Q 50/12 705/15 |
| 2013/0325641 | A1* | 12/2013 | Brown | G06Q 30/0631 705/15 |
| 2013/0339163 | A1* | 12/2013 | Dumontet | G06Q 30/0631 705/15 |
| 2014/0025524 | A1* | 1/2014 | Sims | G06Q 30/0639 705/330 |
| 2017/0098207 | A1* | 4/2017 | Priebatsch | G06Q 20/3224 |
| 2017/0098263 | A1* | 4/2017 | Priebatsch | G06Q 20/3224 |
| 2017/0098264 | A1* | 4/2017 | Priebatsch | H04L 67/52 |
| 2021/0134434 | A1* | 5/2021 | Riley | G16H 50/30 |
| 2022/0058267 | A1* | 2/2022 | Chow | G06Q 30/0263 |

OTHER PUBLICATIONS

• Harrison Flatau. "Inside DoorDash: Machine Learning and Logistics." (Sep. 28, 2018). Retrieved online Mar. 9, 2022. https://softwareengineeringdaily.com/2018/09/28/doordash/ (Year: 2018).*

• Jonah Feldman. "Know the difference! Food Delivery apps vs. Food Aggregator apps." (Aug. 3, 2020). Retrieved online Mar. 9, 2022. https://www.elitemcommerce.com/blog/2020/08/03/what-is-the-difference-for-food-delivery-apps-and-food-aggregator-apps/ (Year: 2020).*

* cited by examiner

SERVICE INTEGRATION WITH USER INTERFACE

BACKGROUND

Today, typical consumers/users maintain a plurality of mobile applications on their phones. Each application is relevant to a specific retailer and services provided by that retailer. Many users have an unmanageable number of these applications on their phones. Consequently, users find it difficult to locate specific retailers or specific services that the users are interested in when such services are desired by the users. A phone search may or may not turn up a desired service because some retailer applications may not be named on the phone in manners that uniquely identify the retailers or their corresponding services.

Some third-party services provide ordering across retailers via a single mobile application. But these third-party services are not truly integrated with the retailers' online customer-facing services. Thus, the items offered through a third-party service's application for a given retailer are often out-of-date, incorrect, missing new items offered by the given retailer, and/or have incorrect item pricing. Additionally, the branding of the retailers are not maintained within the third-party services' applications. Still further, orders received from a third-party service application often require manual intervention to place the orders through a phone call to the retailer associated with a given order or through manually entering the order into the retailer's online customer-facing service associated with the given order.

As a result, retailers have grown frustrated with third-party services. In some cases, retailers have prohibited orders taken through these third-party services' mobile applications because of the out-date item information and out-of-date item pricing information being provided to potential customers of the retailers through the third-party services' mobile applications.

SUMMARY

In various embodiments, methods and a system for service integration with a user interface (UI) are presented.

According to an embodiment, a method for service integration with UI is provided. For example, Application Programming Interfaces (APIs) are processed for searching menus of retailers over a network based on received search criteria that is determined for a mobile application of a mobile device operated by a user. Retailer-provided results are aggregated to produce results that are based on the search with the retailers. The results are sorted to produce sorted results based on sort criteria and the sorted results are provided to the mobile application. An order is processed on behalf of the user using a particular API associated with a particular retailer based on user-provided input data obtained by interacting with the mobile application, by determining order details from the user-provided input data, and by using the particular API associated with the particular retailer to provide the order details to an order system of the particular retailer to place the order.

BRIEF DESCRIPTION OF THE DRAWINGS

FIG. 1I is a diagram of an example screen rendered in the mobile app for an order confirmation, according to an example embodiment.

DETAILED DESCRIPTION

Figure 1A:
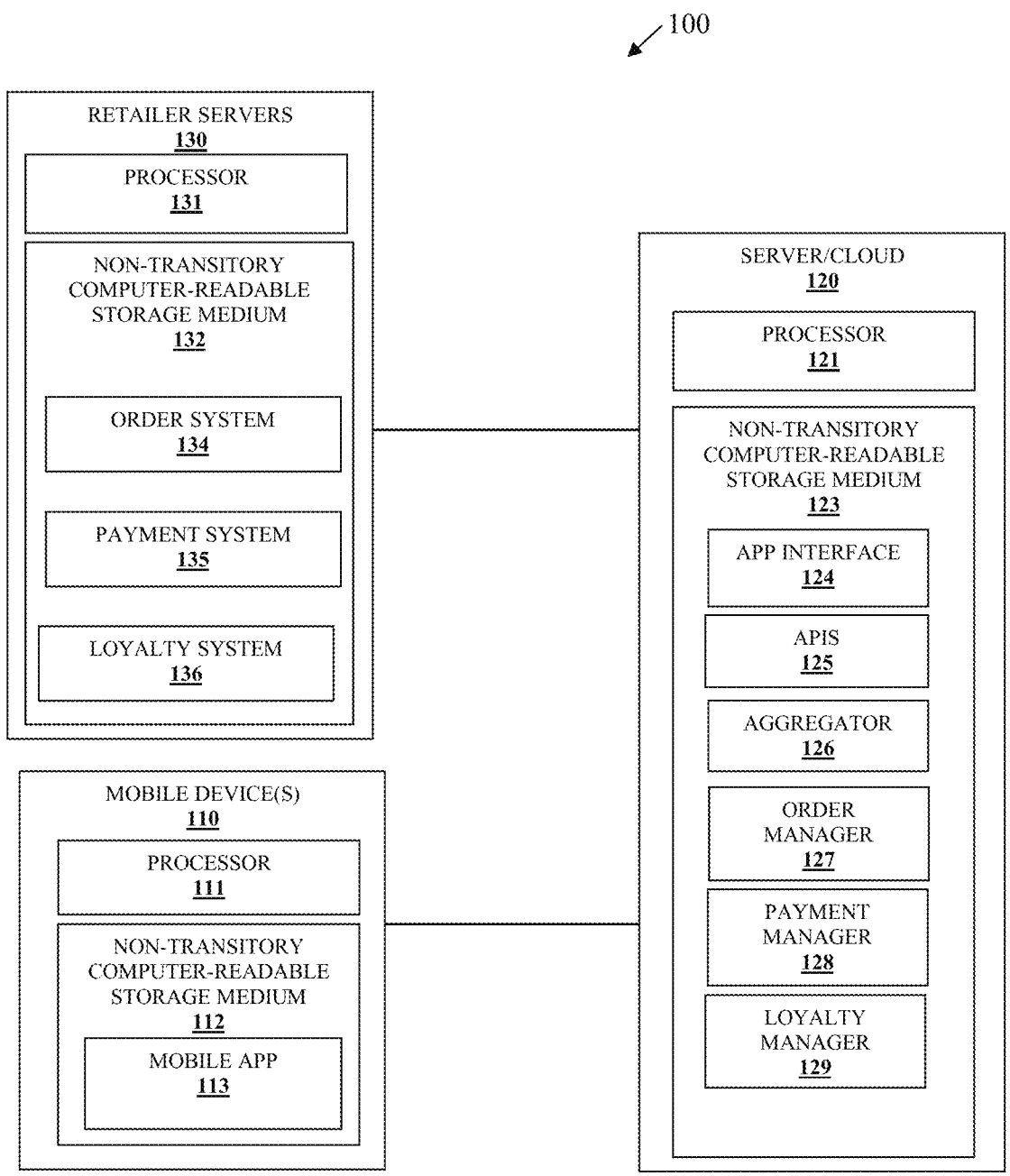
FIG. 1A is a diagram of a system for service integration with UI, according to an example embodiment.

FIG. 1A is a diagram of a system 100 for service integration with UI, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of service integration with UI, presented herein and below.

Typically, existing service integrators (e.g., Door Dash®, Grub Hub®, etc.) require manual interaction or manual phone calls when users place orders with a specific retailer in order to enter or to place an order that the customer made through the service integrators' mobile apps. This is manually intensive can lead to order errors and is time inefficient. Thus, any service integration for ordering is manual and beyond the order processing, there is no further integration with the individual retailers. Furthermore, the individual retailers' menus are not integrated with those retailers' current menus, such that oftentimes these existing service integrators display menu items that are no longer available with the retailers, display the wrong prices for menu items, and/or do not provide new menu items offered by the retailers. This incorrect pricing and offerings for menu items frustrates many retailers to the point that some retailers no longer accept orders through these service integrators As will be discussed herein and below, methods and a system are provided that integrate item ordering, item order confirmation, order pickup/delivery options, and order payment processing across a plurality of disparate retailer service providers (hereinafter just services). The techniques also aggregate item category offerings across the disparate services for up-to-date, current, and real-time menus of the services. A user can operate a single mobile app for browsing, searching, ordering, confirming, selecting pickup/delivery options, receiving order status, and making a payment for an order with a user-selected service though the integration provided by system 100.

System 100 includes a mobile device 110, a server/cloud 120, and a plurality of retailer servers 130.

Mobile device 110 comprises a processor 111 and a non-transitory computer-readable storage medium 112. Medium 112 comprises executable instructions for a mobile app 113.

Server/Cloud 120 comprises a processor 121 and a non-transitory computer-readable storage medium 122. Medium 122 comprises executable instructions for an App interface 124, Application Programming Interfaces (APIs) 125, an aggregator 126, and order manager 127, a payment manager 128, and a loyalty manager 129.

Each retailer server 130 comprises a processor 131 and a non-transitory computer-readable storage medium 132. Medium 1342 comprises executable instructions for an order system 133, a payment system 135, and, optionally, a loyalty system 135.

Each corresponding processor of each corresponding device obtains the corresponding executable instructions from the corresponding mediums, which causes the corresponding processor to perform operations described herein and below for 113, 124-129, and 133-135.

Mobile app 113 presents a user-facing Graphical UI (GUI) for interaction with a user and a server/cloud interface for interaction with API interface 124. Server/cloud interface reports a geographical location for mobile device 110 during interaction with API interface 124 (this can be obtained through location services provided on an Operating System (OS) of mobile device 110. This allows app interface to have a current mobile device physical location for mobile device 110 while interacting with a user through the user-facing GUI.

APIs 125 provide for automated interaction between 126-129 and 133-135. APIs 125 normalize data received from 133-135. Moreover, APIs 125 provide data and commands for operation to 133-135 in specific data formats required by each retailer server 130. In this way, true integration with each service (retailer) is achieved.

Aggregator 126 obtains menu items from services (retailers) based on user-provided inputs and/or selections made with the GUI of app 113 and provided to app interface 124 through the server/cloud interface of app 113. These inputs and/or selections define criteria for searching and obtaining specific item categories across menus of the retailers by aggregator 126 through each retailer's order system 133. API interface 124 interacts with cloud/server interface of app 113 to provide the menus and specific item categories in a normalized format that is recognized and presented by the GUI of app 113 to the user.

Interactive user inputs and/or selections are processed by the app GUI to render a variety of screens on a touch display of mobile device 110 (some example screens rendered by app GUI are presented in FIGS. 1B-1I below).

Similarly, order manager 127 performs user-directed order processing through normalized order details received from app 113 and converted to required formats with each specific retailer's order system 133 using APIs 125.

Further, payment manager 128 performs user-directed payment processing for orders through normalized payment details from app 113 and converted to required formats with each specific retailer's payment system 135 using APIs 125.

In an embodiment, loyalty manager 129 performs user-obtained loyalty processor for orders through normalized loyalty details for the user that are converted to required formats associated with each specific retailer's loyalty system 136 using APIs 125.

In an embodiment, the user may register for a loyalty account with server/cloud service integration provider of server/cloud 120 through registration of mobile device and/or user provided details through the API GUI. In this way, a user may establish loyalty benefits with server/cloud service integration provider across a plurality of retailers and orders associated with those retailers made through app 113.

Regardless of whether any user-registration is made, order manager 127 may maintain an order history for each user based on a mobile device identifier associated with the mobile device 120 having app 113.

In an embodiment, server/cloud 120 may also comprise executable instructions for an account system 160 (shown in FIG. 1J below). Account system 160 may be based on user registration and/or based on mobile device identifier.

In an embodiment, server/cloud 120 may further comprise executable instruction for a Customer Relationship Management (CRM) system (shown in FIG. 1J below). CRM system 160 may provide offers and discounts that are specific to each retailer and offered by the retailers via APIs 125 and integrated with app 113. Additionally, or alternatively, CRM system may provide offers and discounts that are provided by cloud/server service integration provider of cloud/server 120 through app 113.

A profile associated with a registered user or associated with mobile device identifier of mobile device 110 may be maintained on mobile device 110 and communicated by app 110 to 125-129 at a start of any user session with app 113. This maintains an anonymity of the user for privacy-conscious users. Alternatively, and with permission of the user, the profile may be maintained by app interface 124 and available for user during each user session with app 1113. The profile may comprise a variety of information specific to the user, such as home or preferred order delivery address, phone number, name (can be just first name or a combination of both first name and surname), preferred retailers, preferred menu item categories, preferred menu items, preferred delivery/pickup options for orders, preferred wait times expected by the user for an order to be received by the user after order placement, preferred retailers by geographic region or city when the user's location is detected within that region or city during order placement (via app-reported current mobile device location to app interface 124), etc.

In an embodiment, if the user's location is not detected (or if the user wants to search by an address other than their own current location), users may search for a specific address to search by.

Furthermore, app interface 124 may maintain metrics for users based on order histories and payment histories of orders placed by users. These metrics can be mined for aggregations based on retailer, types of retailers, types of menu item categories, types of items, custom-defined geographic regions, custom-defined user-defined types (custom customer segments), and/or various combinations of these aggregations. A retailer provided interface to the metrics may be provided by system 100 for retailers to obtain custom aggregations of the metrics on demand or for system 100 to report custom aggregations of the metrics at predefined intervals of time specific to each retailer.

Interactions between the user (via the app GUI and the app cloud/server interface) with 124 and 126-129 cause the app GUI to render a variety of interactive screens for viewing and inputs of the user during operation of system 100. Example screen renderings, user interactions, and features provided by system 100 are now discussed with reference to FIGS. 1B-1J.

Figure 1B:
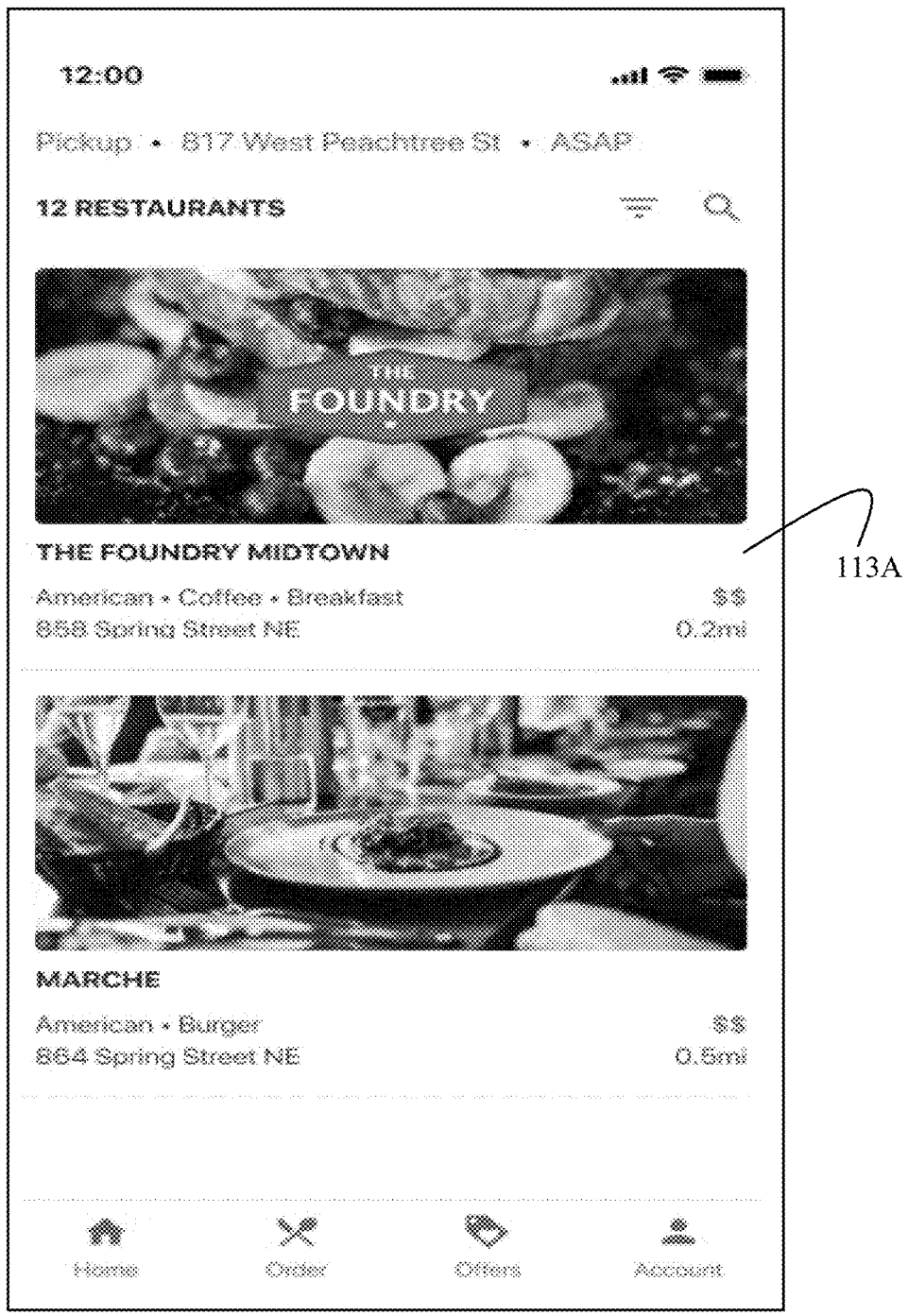
FIG. 1B is a diagram of an example screen rendered in a mobile application (app) based on a current location of a user relative to services, according to an example embodiment.

FIG. 1B is a diagram of an example screen 113A rendered in app 113 through the app GUI based on a current location of a user relative to services, according to an example embodiment.

Screen 113A illustrates a proximity based sorted order of retailers that are available to receive user orders from a user. A current mobile device location is used by app interface 124 to identify the retailers and known locations of the retailers. The corresponding retailer names and corresponding retailer-specific branding (images, logos, themes, language, etc.) are provided to the app GUI for rendering to the user.

Figure 1C:
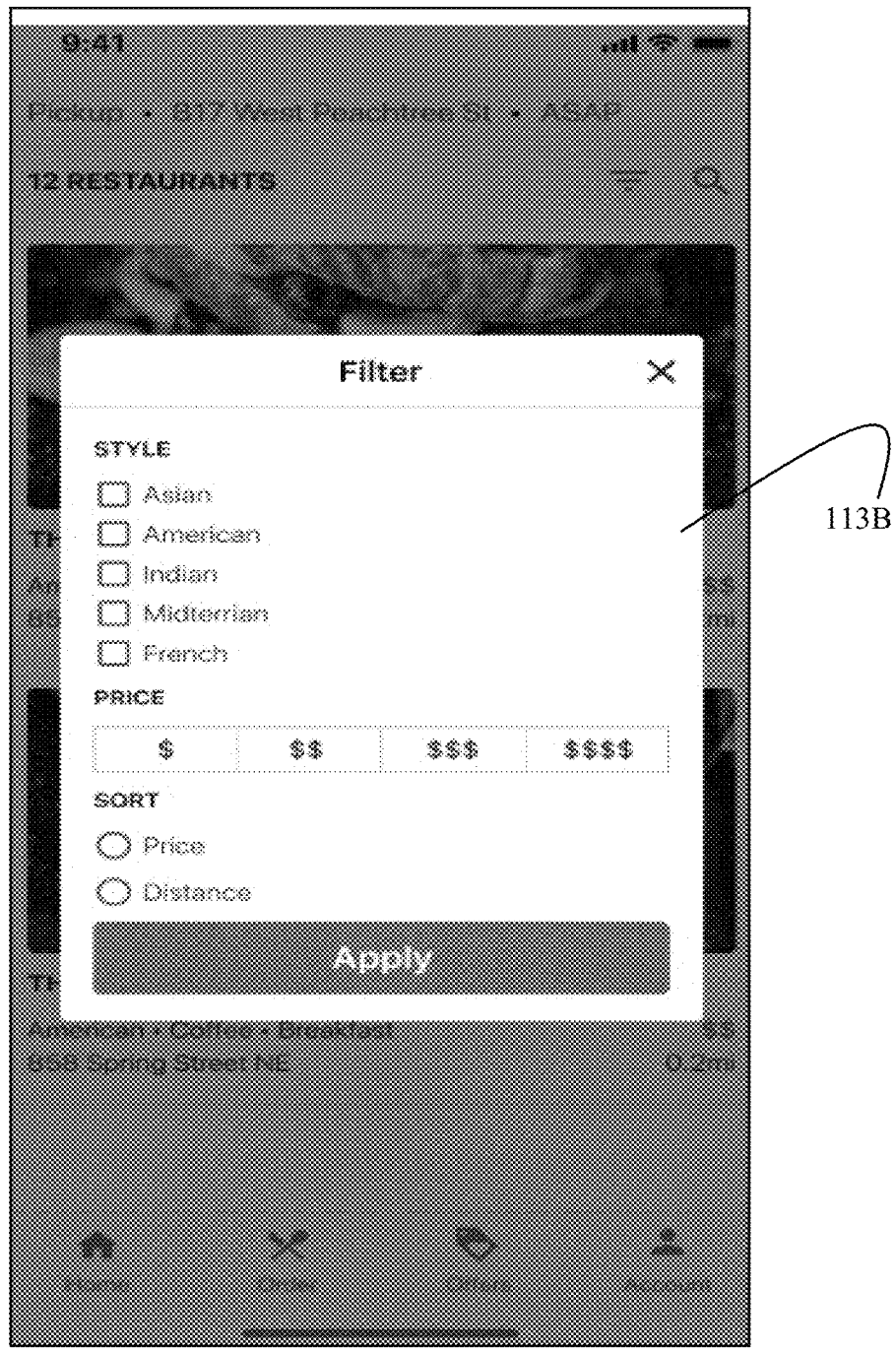
FIG. 1C is a diagram of an example screen rendered in the mobile app to filter categories of items for the services, according to an example embodiment.

FIG. 1C is a diagram of an example screen 113B rendered in the app 113 through the app GUI to filter categories of items for the services based on user-defined filtering criteria, according to an example embodiment.

Screen 113B illustrates user-selectable item search filtering criteria for food type (item category) and price along with a user-selectable sort-order criteria for sorting returned retailers that match the item search filtering criteria in a sort order defined by the sort-order criteria.

Figure 1D:
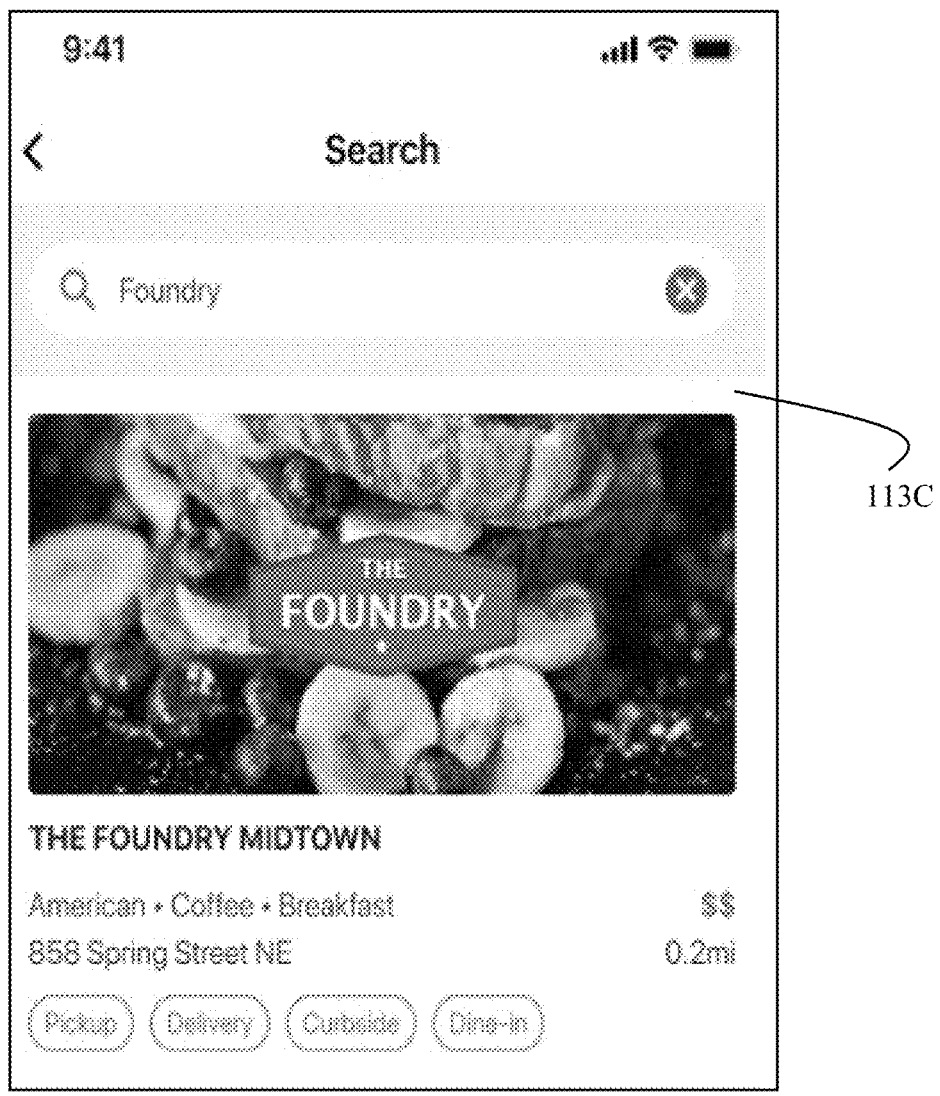
FIG. 1D is a diagram of an example screen rendered in the mobile app to permit a user search on categories and/or services, according to an example embodiment.

FIG. 1D is a diagram of an example screen 113C rendered in the app 113 through the app GUI to permit a user search on categories and/or services, according to an example embodiment.

Screen 113C illustrates a user-entered retailer or service provider search criteria of "Foundry" along with a returned branding for the Foundry retailer with address, distance to user, and user-options to select this retailer for a pickup order, a delivery order, a curbside order, or a dine-in order with the retailer.

Figure 1E:
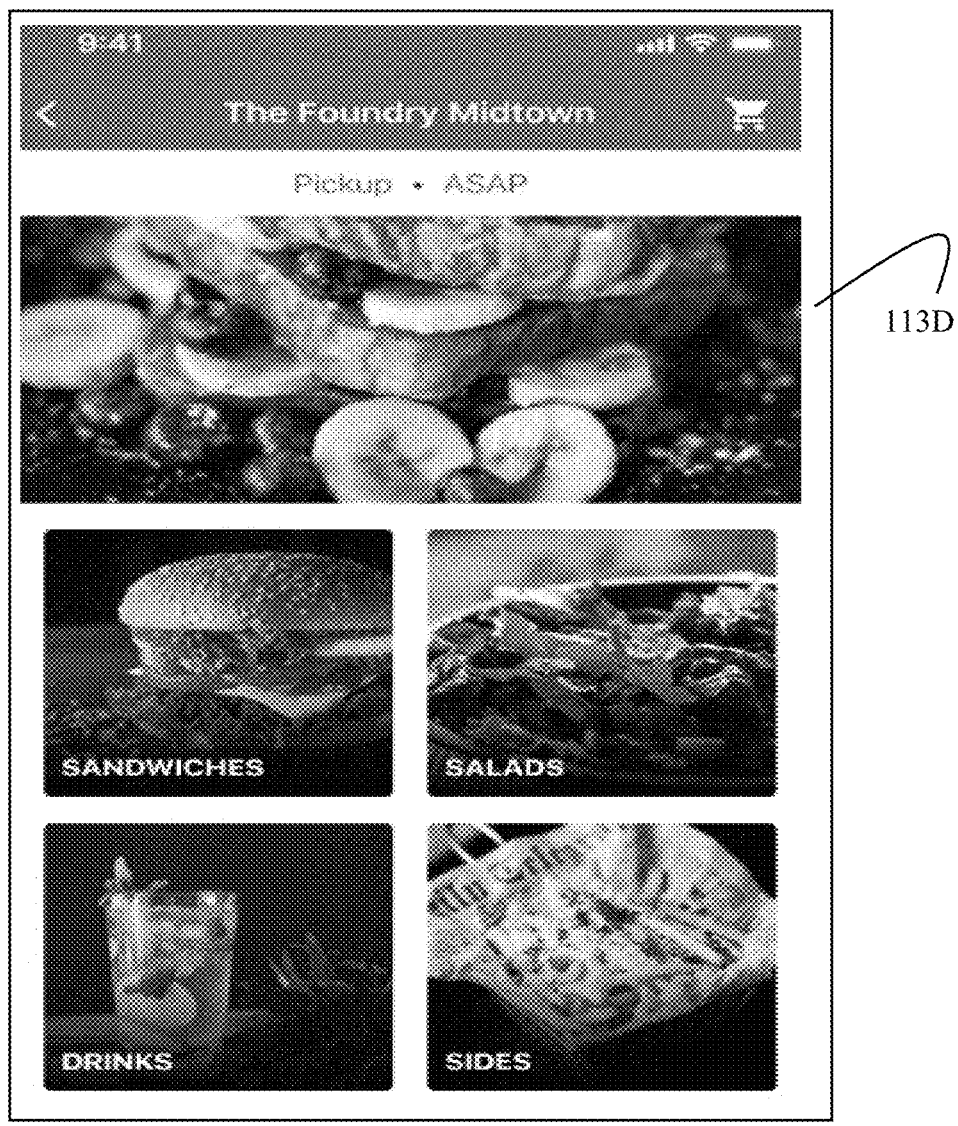
FIG. 1E is a diagram of an example screen rendered in the mobile app for categories of items offered by a user-selected selected service, according to an example embodiment.

FIG. 1E is a diagram of an example screen 113D rendered in app 113 through the app GUI for categories of items offered by a user-selected selected service/retailer, according to an example embodiment.

Screen 113D illustrates menu item categories offered by the Foundry retailer and selected for ASAP pickup by the user from screen 113C of FIG. 1D. The branding for the Foundry's menu is maintained within the screen 113D. Moreover, each menu item category is user-selectable to drill down into the Foundry's items defined by a user-selected category from the Founder's branding of that category.

Subsequent screen renderings allow the user to select specific items within menu item categories to add to a cart, which is maintained by order manager 127.

Figure 1F:
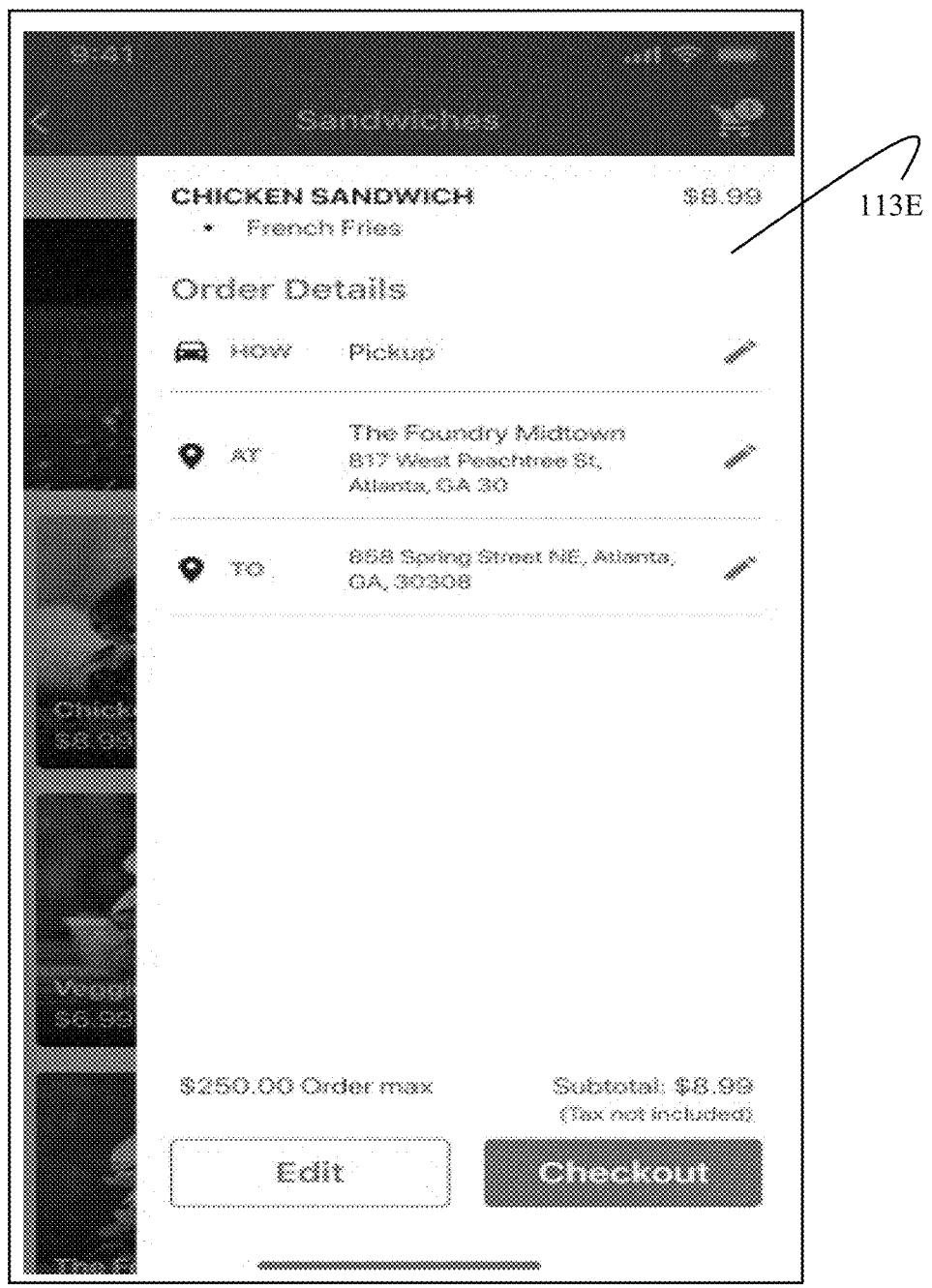
FIG. 1F is a diagram of an example screen rendered in the mobile app for an order summary with a user-selected service, delivery/pickup options, order modification option, and checkout option, according to an example embodiment.

FIG. 1F is a diagram of an example screen 113E rendered in app 113 through the app GUI for an order summary with a user-selected service, delivery/pickup options, order modification option, and checkout option, according to an example embodiment.

Screen 113E illustrates how the user selected to receive order items from the cart (in the continuing example—the user had selected a pickup option for the example order), the retailer name and address associated with the order, and the specific retailer outlet that the order is being received at. Screen 113E also includes a max order dollar amount permitted for online ordering at the selected retailer (in this case $250) and a current subtotal for the pending cart of items ($8.99) with an indication as to whether this does or does not include tax (in this case tax was not included in the subtotal). Furthermore, screen 113E provides to user-selectable options for editing the cart associated with the current order or for proceeding with the checkout process with the retailer's order system 133 using order manager 127.

Figure 1G:
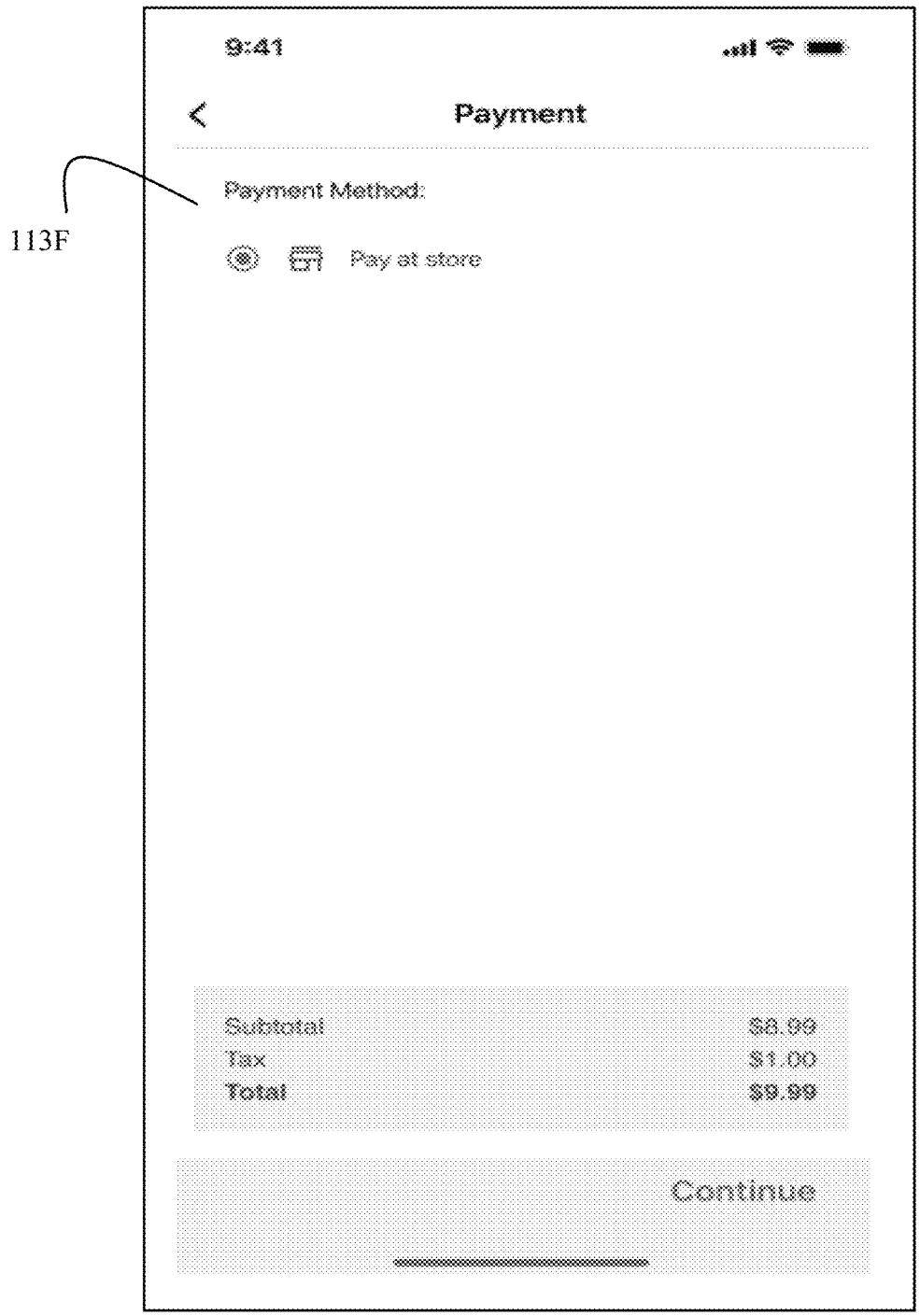
FIG. 1G is a diagram of an example screen rendered in the mobile app for a second order summary with a user-selected pickup, order total, and user-selected payment option, according to an example embodiment.

FIG. 1G is a diagram of an example screen 113F rendered in app 113 through the app GUI for a second order summary with a user-selected pickup, order total, and user-selected payment option, according to an example embodiment.

Screen 113F shows the available options permitted for online ordering at the selected Foundry retailer, which is just one requiring payment in the store during pickup. So, this is auto selected for the user. It is noted that payment manager 128 interacts with the specific payment system 134 of the selected retailer to display payment options. Payment options can include usage of profile-maintained payment card with cloud/server service integration provider when the type of registered payment card is accepted by the specific retailer's payment system 134. Payment card details may also be entered through the app GUI in other rendered screens providing such payment cards are accepted by the retailer's payment system.

In an embodiment, cloud/server service integration provider separately maintains accounts with each retailer and directly processes payment for orders using a user-registered payment method or a user-entered payment method and settles with the corresponding retailers in real time or at other times as dictated by agreements between cloud/server service integration provider and each of the retailers.

Figure 1H:
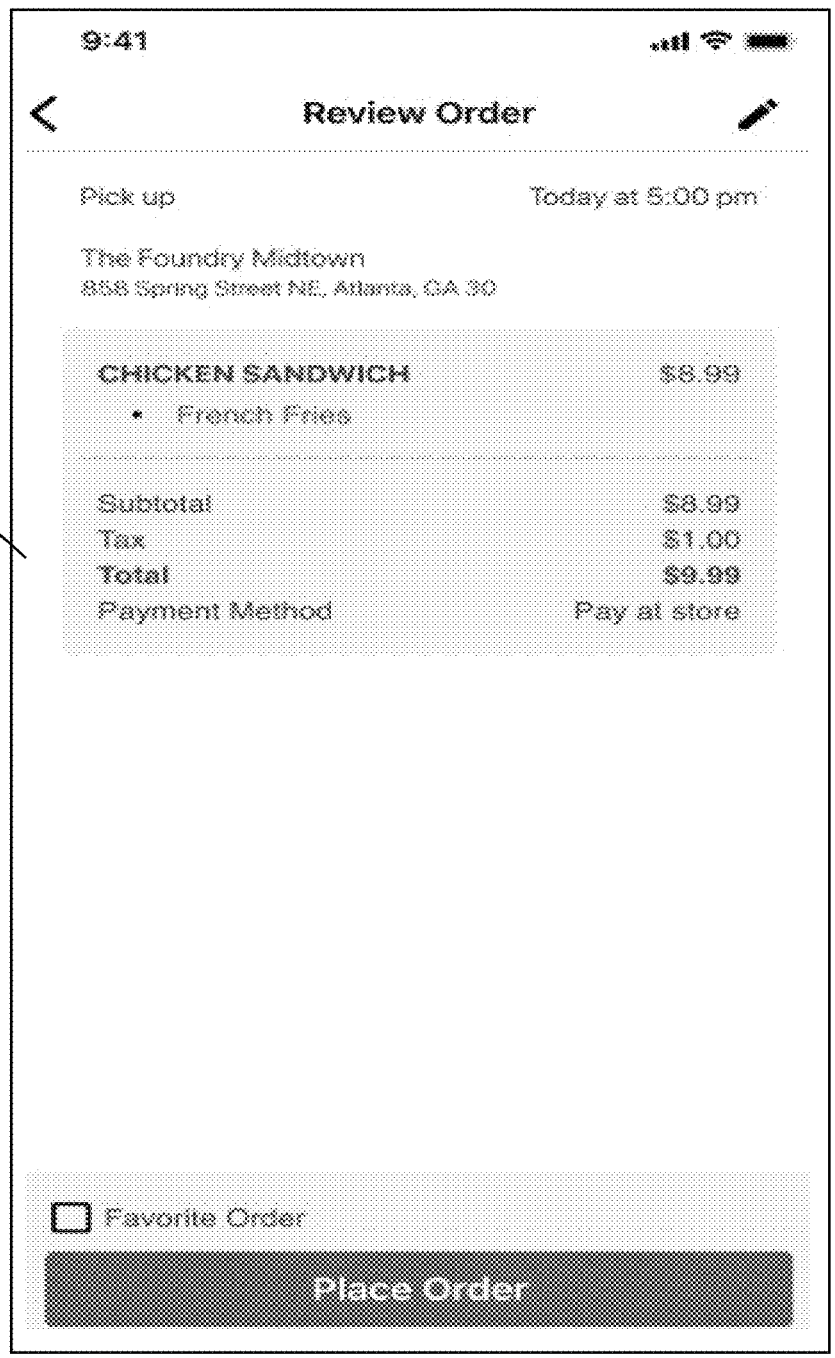
FIG. 1H is a diagram of an example screen rendered in the mobile app for a third order summary with order placement option, according to an example embodiment.
Figure 11:
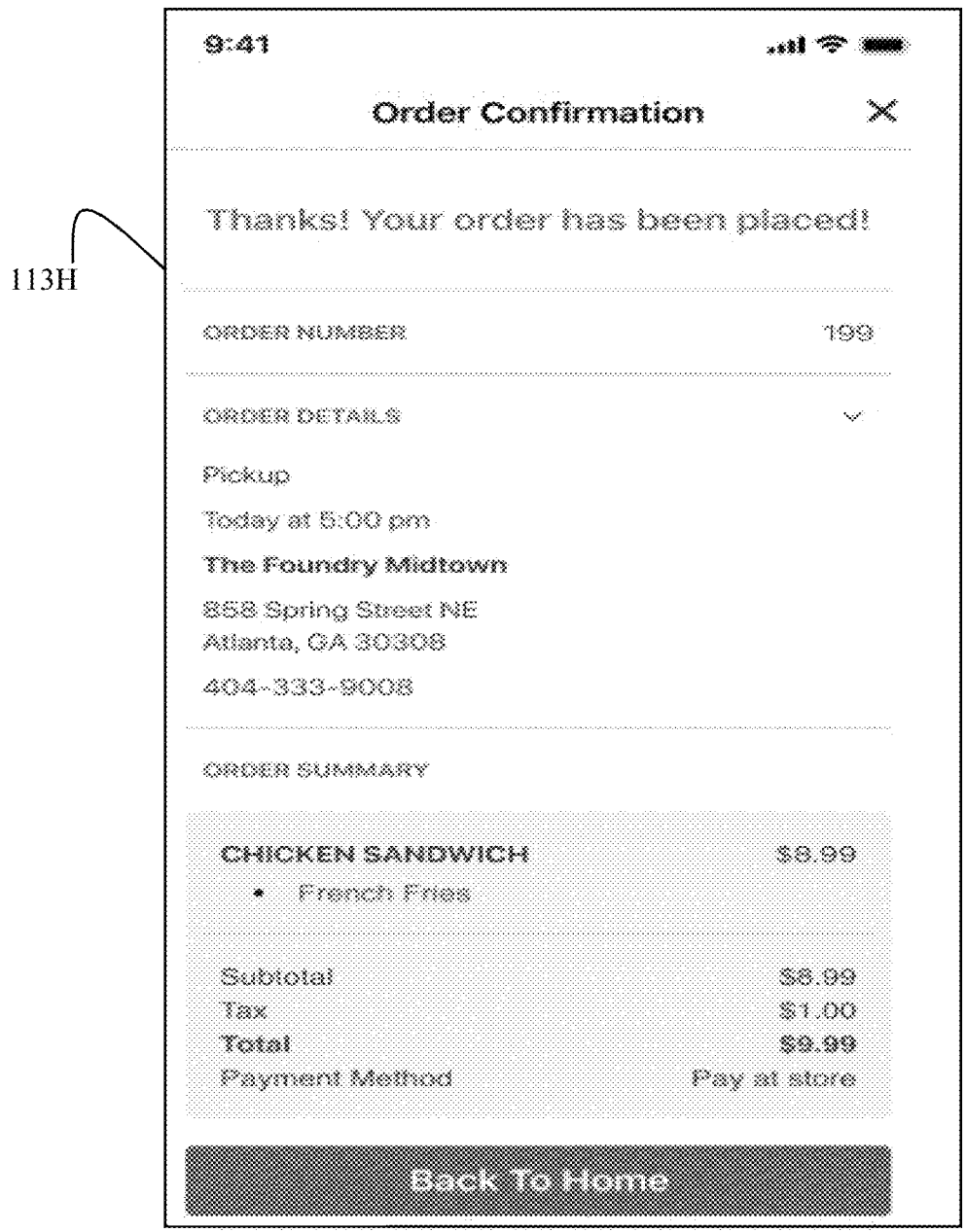

FIG. 1H is a diagram of an example screen 113G rendered in app 113 though app GUI for a third order summary with order placement option, according to an example embodiment.

Screen 113G illustrates specific menu items associated with the user cart and corresponding prices and price total including taxes along with the selected payment method made by the user in screen 113F of FIG. 1G. Screen 113G also illustrates an option for the user to save the order as a favorite order with the user profile (anonymously maintained on mobile device 110 or maintained by server 120). Further, screen 113G illustrates a "place order" option that confirms the order with the retailer when selected and/or performs payment processing for the order total using a user-selected payment method (which is not the case in the running example for the Foundry).

FIG. 1I is a diagram of an example screen rendered in app 113 through app GUI for an order confirmation, according to an example embodiment.

Screen 113H illustrates a confirmation that order manager 127 has received from the selected retailer's order system 133 that the items in the cart have been confirmed as ordered along with order number and a summary of the details (pickup at a specific retailer store location of the Foundry, items ordered, price, tax, and total). Screen 113H also includes an option for the user to return to a home page of cloud/server service integration provider of cloud/server 120.

Figure 1J:
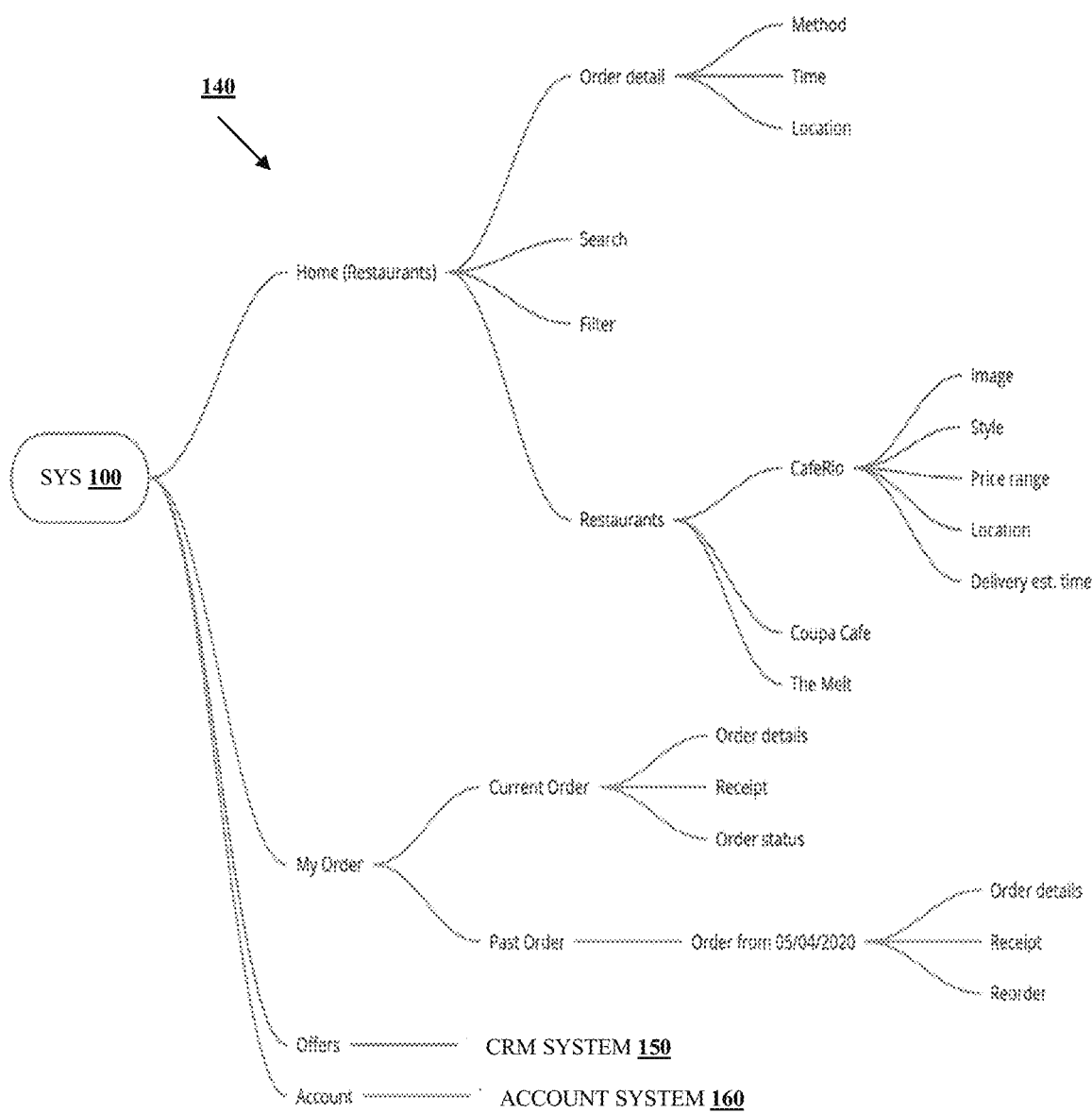
FIG. 1J is a diagram that illustrates a hierarchical process flow for the system of FIG. 1A, according to an example embodiment.

FIG. 1J is a diagram that illustrates a hierarchical process flow 140 for the system of FIG. 1A, according to an example embodiment.

A top flow illustrates user interaction with the app GUI from the home page of app 113 where the user can browse, search, and filter to select a specific retailer and that retailer's branded menu and the user can make selections for how the order is going to be received by the user, the timing of the order, and the specific location of the order. Each restaurant/retailer may have specific locations/names, and their corresponding branding for images, style, price range, location, and delivery estimate time for a given order that is made.

The middle flow illustrates app GUI screens for current order details, receipt, and status as well as options to review past orders (which can be filtered based on dates (as illustrated with date May 4, 2020 in FIG. 1J).

The last two flows illustrate integration with offers through CRM system 150 and user account management through account system 160.

In an embodiment, app 113 is provided through web pages of a web browser of mobile app 113; rather than a specific app download.

In an embodiment, app 113 is provided through App Clips® distributed by Apple. This allows app 113 to be launched from different mediums (website, Quick Response (QR) codes, Near Filed Communication (NFC) tags, or from other applications, etc.), but the launched app 113 is the same in every case, and is comprised mostly of a snippet of the same codebase as app 113.

System 100 provides real-time integration with systems of retailers to provide aggregated and seamless order management with a plurality of retailers. A single app 113 provides one interface for the user to navigate and place orders across disparate retailers and their order systems 133, payment systems 134, and optionally loyalty systems 135. This means users do not have to maintain multiple retailer apps on their devices 110. Moreover, each retailer's branding is maintained during ordering through app 113 along with up-to-date menus and up-to-date pricing for the menu items.

Figure 2:
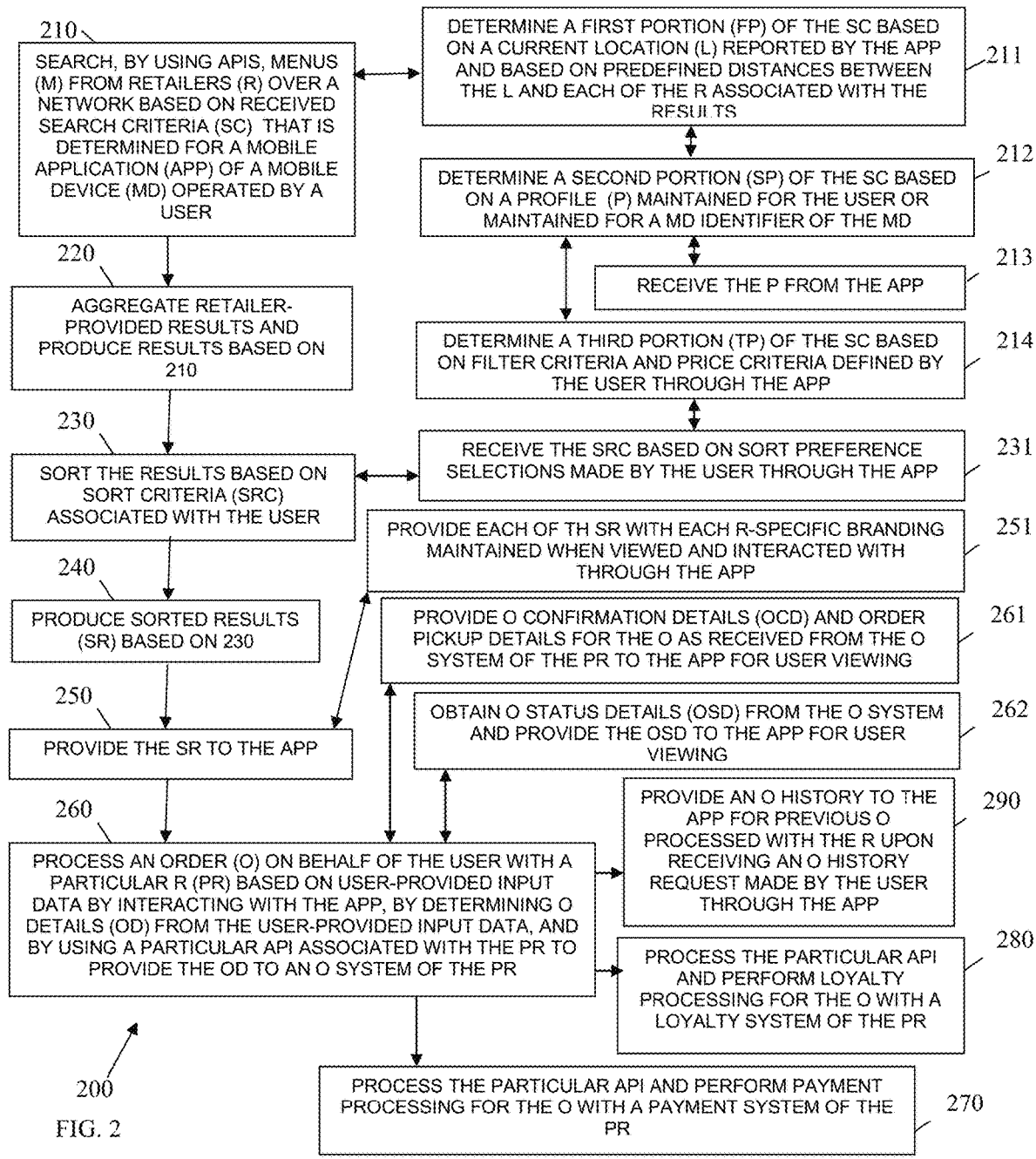
FIG. 2 is a diagram of a method for service integration with UI, according to an example embodiment.

The above-noted embodiments and other embodiments are now discussed with FIG. 2.

FIG. 2 is a diagram of a method 200 for service integration with UI, according to an example embodiment. The software module(s) that implements the method 200 is referred to as a "retailer service integrator." The retailer service integrator is implemented as executable instructions programmed and residing within memory and/or a non-transitory computer-readable (processor-readable) storage medium and executed by one or more processors of a device. The processor(s) of the device that executes the retailer service integrator are specifically configured and programmed to process the retailer service integrator. The retailer service integrator may have access to one or more network connections during its processing. The network connections can be wired, wireless, or a combination of wired and wireless.

In an embodiment, the retailer service integrator executes on cloud/server 120 In an embodiment, the cloud/server 120 is a server. In an embodiment cloud/server 120 is a cloud.

In an embodiment, the retailer service integrator is all of, or some combination of 124-129.

At 210, the retailer service integrator uses APIs 124 to search menus from retailers (via retailer servers 130) over a network based on search criteria that is determined for a mobile app 113 of a mobile device 110 operated by a user.

In an embodiment, at 211, the retailer service integrator 1) determines a first portion of the search criteria based on a current location reported by app 113 and based on predefined distances between the location and each of the retailers (retailer store locations) associated with search results; or 2) determines the first portion of the search criteria based on a user-defined or user-set location and further based on other predefined distances between the user-defined or the user-set location and each of the retailers associated with the results.

In an embodiment of 211 and at 212, the retailer service integrator determines a second portion of the search criteria based on a profile maintained for the user or maintained for a mobile device identifier of mobile device 110.

In an embodiment of 212 and at 213, the retailer service integrator receives the profile from app 113 (here anonymity of the user may be maintained with retailer service integrator not retaining the profile after an order session with the user through app 113 ends).

In an embodiment of 212 and at 214, the retailer service integrator determines a third portion of the search criteria based on filter criteria and price criteria defined by the user through app 113.

At 220, the retailer service integrator aggregates retailer-provided results and produces results (search results) based on the searching with the search criteria at 210.

At 230, the retailer service integrator sorts the results based on sort criteria associated with the user or the mobile device identifier of mobile device 110.

In an embodiment of 214 and 230, at 231, the retailer service integrator receives the sort criteria based on sort preference selections made by the user through app 113.

At 240, the retailer service integrator produces sorted results based on 230 and the sort criteria.

At 250, the retailer service integrator provides the sorted results to app 113.

In an embodiment, at 251, the retailer service integrator provides each of the sorted results with each retailer-specific branding maintained when viewed and interacted with through app 113 by the user. Here, page themes, images, logos, styles, layouts, etc. of each specific retailer is maintained in the sorted results provided to app 113.

At 260, the retailer service integrator processes an order on behalf of the user with a particular retailer based on user-provided input data by interacting with app 113, by determining order details from the user-provided input data, and by using a particular API associated with the particular retailer to provided the order details to an order system 134 of the particular retailer.

In an embodiment, at 261, the retailer service integrator provides order confirmation details and order pickup details for the order as received from the order system 134 of the particular retailer to app 113 for user viewing.

In an embodiment, at 262, the retailer service integrator obtains order status details from the order system 134 and provides the order status details to app 113 for user viewing.

In an embodiment, at 270, the retailer service integrator processes the particular API and performs payment processing for the order with a payment system 135 of the particular retailer on behalf of the user.

In an embodiment, at 280, the retailer service integrator processes the particular API and performs loyalty processing for the order with a loyalty system 136 of the particular retailer.

In an embodiment, at 290, the retailer service integrator provides an order history to app 113 for previous orders processed with the retailers upon receiving an order history request made by the user through app 113.

Figure 3:
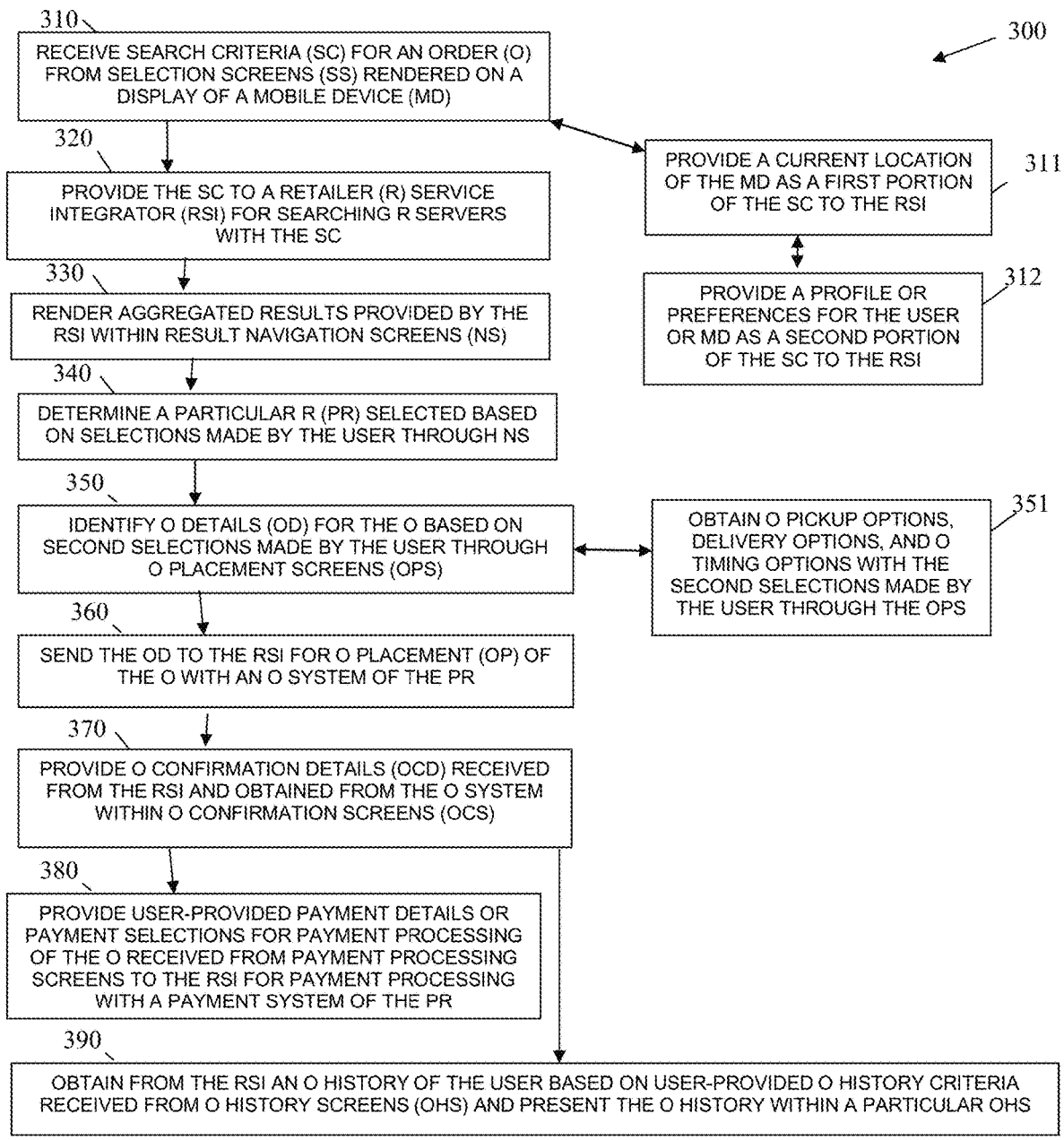
FIG. 3 is a diagram of another method for mobile navigational control of a terminal's UI, according to an example embodiment.

FIG. 3 is a diagram of a method 300 for service integration with UI, according to an example embodiment. The software module(s) that implements the method 300 is referred to as a "mobile app." The mobile app is implemented as executable instructions programmed and residing within memory and/or a non-transitory computer-readable (processor-readable) storage medium and executed by one or more processors of a mobile device. The processor(s) of the device that executes the mobile app are specifically configured and programmed to process the mobile app. The mobile app may have access to one or more network connections during its processing. The network connections can be wired, wireless, or a combination of wired and wireless.

In an embodiment, the mobile device that executes the mobile app is mobile device 110. In an embodiment, the mobile device 110 is a phone, a tablet, a laptop, or a wearable processing device.

In an embodiment, the mobile app is app 113.

Mobile app interacts with method 200 over a network for purposes of defining orders, placing orders, confirming orders with a retail service integrator represented by all or some combination of 124-129 and/or method 200.

At 310, the mobile app receives search criteria for an order from selection screens rendered on a touch display of a mobile device operated by a user.

In an embodiment, at 311, the mobile app provides a current location of the mobile device as a first portion of the search criteria to a retailer service integrator (124-129 and/or method 200).

In an embodiment of 311 and at 312, the mobile app provides a profile or preferences for the user or a mobile device identifier for the mobile device as a second portion of the search criteria to the retailer service integrator.

At 320, the mobile app provides the search criteria to the retailer service integrator for searching retailer servers 130 with the search criteria.

At 330, the mobile app renders aggregated results provided by the retailer service integrator within result navigation screens on the display of the mobile device.

At 340, the mobile app determines a particular retailer selected based on selections made by the user through the navigation screens.

At 350, the mobile app identifies order details for the order based on second selections made by the user through order placement screens rendered on the display of the mobile device.

In an embodiment, at 351, the mobile app obtains order pickup options, delivery options, and order time options with the second selections made by the user through the order placement screens.

At 360, the mobile app sends the order details to the retailer service integrator for order placement of the order with an order system 134 of the particular retailer.

At 370, the mobile app provides order confirmation details received from the retailer service integrator and obtained from the order system 134 within order confirmation screens rendered on the display of the mobile device.

In an embodiment, at 380, the mobile app provides user-provided payment details or payment selections for payment processing of the order received from payment processing screens rendered on the display of the mobile device. The payment details or payment selections are provided to the retailer service integrator for payment processing with a payment system 135 of the particular retailer.

In an embodiment, at 390, the mobile app obtains from the retailer service integrator order history data of the user based on user-provided order history criteria received from order history screens rendered on the display of the mobile device. The mobile app presents the order history within a particular order history screen to the user for viewing and any further user interaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
providing executable instructions to a processor of a server from a non-transitory computer-readable storage medium causing the processor to perform operations comprising:
searching, by using Application Programming Interfaces (APIs) and over a network, menus associated with retailers using search criteria that is determined from a mobile application of a mobile device, wherein the mobile device is operated by a user;
aggregating retailer-provided results obtained from the searching and producing aggregated results;
sorting the aggregated results based on sort criteria associated with the mobile device;
producing sorted results based on the sorting;
providing the sorted results to the mobile application, wherein providing further providing the sorted results as a proximity-based sorted order screen of the aggregated results that the mobile application displays on the mobile device to the user, each retailer identified in the proximity-based sorted order screen by a retail-specific image, a distance from the user to the corresponding retailer, a type of retailer, an address of to the retailer, and a price indication and wherein each sorted result maintains the corresponding retailer's user interface theme, logos, and images within the mobile application;
processing an order with on behalf of the user with a particular retailer based on user-provided input data, wherein the user-provided input data is obtained by interacting with the mobile application, wherein processing further includes determining order details from the user-provided input data and using a particular API associated with the particular retailer to place the order details with an order system of the particular retailer; and
processing a second particular API and performing payment processing for the order with a payment system associated with the particular retailer based on payment details obtained from the user through the mobile application.

2. The method of claim 1, wherein the operations further comprise processing a third particular API and performing loyalty processing for the order with a loyalty system of the particular retailer.

3. The method of claim 1, wherein the operations further comprise providing an order history to the mobile application for previous orders processed with the retailers upon receiving an order history request made by the user through the mobile application.

4. The method of claim 1, wherein searching further includes one of: 1) determining a first portion of the search criteria based on a current mobile device location reported by the mobile application and based on predefined distances between the mobile device location and each of the retailers associated with the retailer-provided results, and 2) determining the first portion of the search criteria based on a user-set location and further based on other predefined distances between the user-set location and each of the retailers associated with the retailer-provided results.

5. The method of claim 4, wherein searching further includes determining a second portion of the search criteria based on a profile maintained a mobile device identifier of the mobile device.

6. The method of claim 5, wherein determining the second portion further includes receiving the profile from the mobile application.

7. The method of claim 5, wherein searching further includes determining a third portion of the search criteria based on filter criteria and price criteria defined by the user through the mobile application.

8. The method of claim 7, wherein sorting further includes receiving the sort criteria based on sorting preference selections made by the user through the mobile application.

9. The method of claim 1, wherein providing further includes providing each of the sorted results with each retailer-specific branding maintained when viewed and interacted with by the user through the mobile application.

10. The method of claim 1, wherein processing further includes providing order confirmation details and order pickup details for the order as received from the order system of the particular retailer to the mobile application for viewing by the user.

11. The method of claim 1, wherein processing further includes obtaining order status details from the order system of the particular retailer and providing the order status details to the mobile application for viewing by the user.

12. A method, comprising:
providing executable instructions to a processor of a server from a non-transitory computer-readable storage medium causing the processor to perform operations comprising:
receiving search criteria defined by a user for an order from selection screens generated by a mobile application on a display of a mobile device;
providing the search criteria to a retailer service integrator for searching retailer servers with the search criteria;
rendering aggregated results provided by the retailer service integrator within result and navigation screens that are presented on the display through the mobile application, wherein a result screen is provided on the display each retailer identified in the result screen by a retail-specific image, a distance from the user to the corresponding retailer, a type of retailer, an address of to the retailer, and a price indication, wherein each aggregated result presented within the result and navigation screens maintain the corresponding retailer's user interface theme, logos, and images within the result and navigation screens;
determining a particular retailer selected based on selections made by the user through the result and navigation screens;
rendering order placement screens that are presented on the display through the mobile application based on the particular retailer selected;
identifying order details for the order based on second selections made by the user through the order placement screens that were presented on the display through the mobile application;
sending the order details to the retailer service integrator for order placement of the order with an order system of the particular retailer;
providing order confirmation details received from the retailer integrator and obtained from the order system within order confirmation screens that are rendered on the display and presented to the user through the mobile application;
rendering payment processing screens presented to the user through the mobile application and receiving user-provided payment details from the user through the payment processing screens; and
providing the user-provided payment details, received from the user through the payment processing screens, to the retailer service integrator for payment processing of the order with a payment system of the particular retailer.

13. The method of claim 12, wherein the operations further comprise obtaining from the retailer service integrator an order history of the user based on user-provided order history criteria received from order history screens and presenting the order history within a particular order history screen for user viewing, wherein the order history screens were order history screens were rendered on the display through the mobile application.

14. The method of claim 12, wherein providing the search criteria further includes providing a current location of the mobile device as a first portion of the search criteria to the retailer service integrator.

15. The method of claim 14, wherein providing the current location further includes providing a profile for the user as a second portion of the search criteria to the retailer service integrator.

16. The method of claim 12, wherein identifying the order details further includes obtaining pickup options, delivery options, and order timing options with the second selections made by the user through the order placement screens.

17. A system comprising:
a mobile device comprising a mobile processor and a mobile non-transitory computer-readable storage medium;
the mobile non-transitory computer-readable storage medium comprising mobile executable instructions;
a server comprising a server processor and a server non-transitory computer-readable storage medium;
the server non-transitory computer-readable medium comprising server executable instructions;
the mobile executable instructions when executed by the mobile processor from the non-transitory mobile computer-readable storage medium cause the mobile processor to perform first operations comprising:

rendering user interface (UI) screens for defining an order, placing the order, and order confirmation within a touch display of a mobile device operated by a user;

receiving user-provided selections and input data for the order;

providing the user-provided selections and input data to the server executable instructions; and updating the screens based on information returned from the server executable instructions for the order;

the server executable instructions when executed by the server processor from the server non-transitory computer-readable storage medium cause the server processor to perform second operations comprising:

searching a plurality of disparate retailers with search criteria that is at least partially defined by the user-provided selections and the input data;

aggregating results returned from the disparate retailers based on the searching;

sorting the results as sorted results;

providing the sorted results to the mobile executable instructions as a first portion of the information and maintaining with the sorted results branded information for each of the disparate retailers, a user interface theme for each of the disparate retailers and logos for each of the disparate retailers associated with the sorted results, wherein the first portion is provided to the mobile executable instructions as a result screen that is displayed on the display of the mobile device and identifies for each retailer the corresponding branding information, a distance from the user to the corresponding retailer, a type of retailer, an address of to the retailer, and a price indication;

interacting with a particular order system of a particular disparate retailer based on the user-provided selections and the input data corresponding to the order;

providing order confirmation details and order placement details to the mobile executable instructions as a second portion of the information, wherein the order confirmation details and the order placement details obtained based on the interacting with the particular order system;

interacting with a particular payment processing system of the particular disparate retailer based on the user-provided selections and the input data corresponding to payment processing and provided by the user through the mobile executable instructions; and providing payment confirmation details, received from the interacting with the particular payment processing system, to the mobile executable instructions as a third portion of the information.

* * * * *